Oct. 13, 1953 C. A. JOHNSON 2,655,554

GENERATION OF PICTURE SIGNALS FOR TELEVISION TRANSMISSION

Filed May 27, 1949

Inventor:
CHARLES ALAN JOHNSON
By [signature]
Attorney

Patented Oct. 13, 1953

2,655,554

UNITED STATES PATENT OFFICE 2,655,554

GENERATION OF PICTURE SIGNALS FOR TELEVISION TRANSMISSION

Charles Alan Johnson, East Twickenham, England, assignor to Electric & Musical Industries Limited, Hayes, England, a company of Great Britain Application May 27, 1949, Serial No. 95,603
In Great Britain June 3, 1948

8 Claims. (Cl. 178—7.2)

Figure 1:
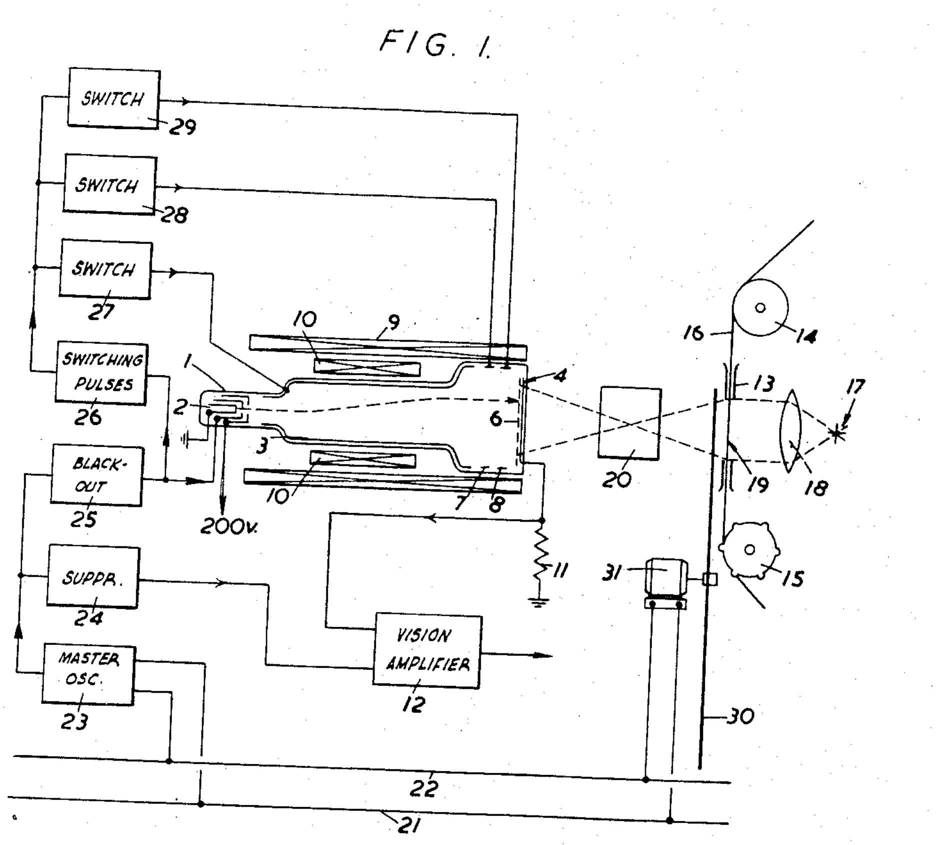

This invention relates to the generation of picture signals for television transmission and the invention relates especially but not exclusively to the generation of picture signals from cinematograph film with the aid of a so-called C. P. S. television transmission tube, that is a tube which is adapted to operate with cathode potential stabilisation.

A form of television transmission tube which is commonly used in practice comprises a target which is capable of storing charges in such a way that when an image of the object for transmission, which image may be a light image or an electron image, is projected on said target, elemental areas thereof acquire different potentials. Such a target is hereinafter and in the claims referred to as a mosaic electrode in accordance with common usage. Further in this form of tube, means is provided for generating a beam of electrons, and on operation of the tube signals representative of an image projected on said target are generated by causing a beam of electrons generated by said last-mentioned means to execute successive scanning traversals of the target. Such a television transmission tube is hereinafter referred to as a tube of the kind described and if the tube is a C. P. S. tube it is so constructed and its operating conditions are such that during scanning said beam of electrons is caused to approach the target at a low velocity so that the elemental areas are periodically restored by said scanning to an equilibrium potential corresponding substantially to that of the cathode from which the electrons of said beam originate.

It is known that, with a C. P. S. television transmission tube if the potential of the elements of the target electrode become highly positive with reference to the potential of said cathode, the tube may become unstable in its operation and the correspondence between the light image and the generated picture signals may become lost. It is moreover, readily possible for the potential of said elements to become highly positive if the intensity of the light image is higher than a desirable level, because there is usually at least one electrode, namely the wall anode, relatively near to the target electrode and maintained at a potential substantially positive with reference to the cathode potential, and it can therefore saturate the photo-electron emission or secondary-electron emission from the elements of the target electrode. Some difficulty is therefore experienced when a C. P. S. television transmission tube is utilised to generate picture signals from the light image formed by light transmission through a cinematograph film, since if the illumination of the film is of sufficient intensity to provide satisfactory picture signals from less transparent parts of the film, the tube may well be caused to become unstable at more transparent parts of the film. A similar difficulty may occur in other cases and with other television transmission tubes of the kind described if there is, sufficiently near to the target electrode, another electrode which is required to be at a potential which has an undesirable effect on the charging of the target when an image of the object for transmission is projected thereon.

The object of the present invention is to provide an improved apparatus for generating picture signals for television transmission with the aid of a television transmission tube of the kind described, with a view to reducing the difficulty referred to.

Figure 2:
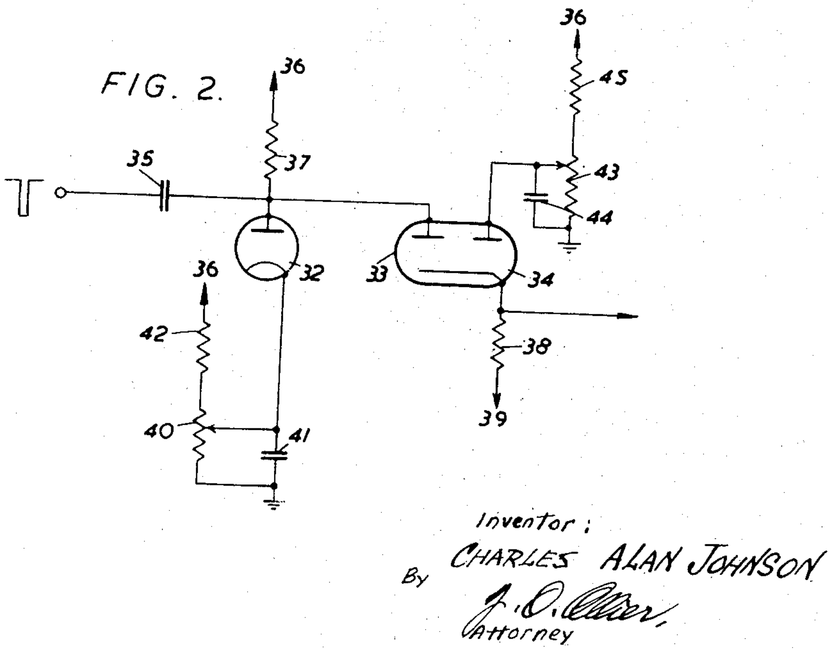

In order that the said invention may be clearly understood and readily carried into effect, the same will now be more fully described with reference to the accompanying drawings, in which:

Figure 1 illustrates diagrammatically and partly in block form one example of apparatus for transmitting television signals from cinematograph film according to the present invention, and Figure 2 is a diagrammatic detail view of part of Figure 1.

Referring to the drawing, the apparatus illustrated comprises a C. P. S. television transmission tube 1 which comprises a conventional electron gun 2 consisting of a cathode, modulator electrode and anode. The tube has a wall anode 3 and a target comprising a transparent signal plate 4 and a mosaic of conductive photo-sensitive elements indicated by the dotted lines 5, the mosaic being insulated from the signal plate 4 by an intervening transparent insulating layer. Coaxial with the wall anode and between it and the plane of the mosaic 5 there are disposed annular electrodes 7 and 8 which serve respectively as an ion trap, and a decelerating electrode. The tube 1 is enclosed in a solenoid 9 which serves, in known manner, to produce an axial focussing magnetic field and the tube is provided with scanning coils for deflecting the beam in the tube in mutually perpendicular directions at line and frame frequency one pair of such coils being indicated at 10. A load impedance 11 is connected to the signal plate and signals set up across this impedance are applied to a vision amplifier 12 and thence to subsequent stages to the transmitting apparatus (not shown).

The apparatus is also provided with a cinematograph film projector having a film gate 13, and a roller 14 and sprocket 15 for guiding the film being televised past the gate 13, the film, indicated at 16, being a cinematograph film having images printed thereon. The projector is provided with mechanism for rotating the sprocket 15 intermittently so as to move the film intermittently past the gate 13, said mechanism not being shown as it may be of any conventional construction such as is commonly employed in cinematograph film projectors. It will be assumed that the apparatus is intended for use in a television system in which the scanning rate is 25 complete scanning cycles per second each scanning cycle comprising two interlaced television frames. The mechanism for operating the film is therefore arranged to move the film at 25 film frames per second. A light source 17 and an optical condenser 18 are provided for uniformly illuminating the aperture 19 of the gate 13, while an optical system 20 is provided, capable of projecting a light image of the aperture 19 on to the mosaic 6 of the tube 1. It will be appreciated that when an exposed film frame is illuminated in the aperture 19, the light image projected by the system 20 will be modulated in intensity in dependence upon the photographic image recorded on the film 16.

Power for operating the apparatus is derived from a suitable 50 cycle per second supply, indicated in the drawing as main bus-bars 21 and 22, and the operation of the television tube 1 is controlled by a master oscillator 23 which is arranged to generate a 50 cycle per second pulse waveform. This pulse waveform controls in known manner the generation of line and frame frequency sawtooth scanning waveforms which are applied to the scanning coils of the tube 1, and it also controls a suppression pulse generator 24 which generates frame frequency pulses whose commencements occur a short time before the commencement of the return stroke in the frame frequency scanning waveform, and whose terminations occur a short time after termination of said return stroke. The suppression pulses are applied to the amplifier 12 with such amplitude and phase that the output of the amplifier 12 is suppressed during the occurrence of each suppression pulse. The master oscillator 23 also controls a black-out pulse generator 25 which generates frame frequency pulses occurring wholly within the time duration of the suppression pulses, but overlapping the return strokes of the frame scanning waveform, said black-out pulses being applied to the modulator electrode of the gun 2 to extinguish the beam therein during said return strokes. The black-out pulses are also fed to a switching pulse generator 26 which generates frame frequency pulses which occur wholly within the time duration of the black-out pulses. The last-mentioned pulses are fed to three switching circuits 27, 28 and 29, the said switching circuits serving to control the potential which is applied to the wall anode 3, the ion trap 7 and the decelerating electrode 8 of the tube 1. Between occurrences of the switching pulses, when scanning of the mosaic screen 6 by the beam of electrons from the gun 2 occurs, the switching circuits 27, 28 and 29 serve to apply to the electrodes 3, 7 and 8 respectively potentials of say 200, 300 and 50 volts with respect to the potential of the cathode of the gun 2, shown as earthed. The anode of the gun 2 is connected to a source of potential of about 200 volts, and the load impedance 11 is earthed. However during the occurrence of the switching pulses the potentials, applied to the electrodes 3, 7 and 8 are switched by the circuits 27, 28 and 29 to about 5 volts positive in each case. The generators 24, 25 and 26 may be of any suitable construction, a suitable form of circuit being for example illustrated in United States Patent No. 2,190,753.

A shutter 30 indicated diagrammatically as a disc having an aperture (not shown) is mounted for rotation in front of the aperture 19 of the film gate 13, so that the aperture of the shutter 30 can register once in each rotation of the shutter with the aperture 19. The shutter 30 is driven by a synchronous motor 31 supplied with power from the bus-bars 21 and 22 so that it rotates once per film frame and the shutter aperture is so dimensioned that the shutter wholly obscures the light image, which would otherwise be projected by the system 20 on the mosaic 6, during the entire intervals between successive switching pulses generated by the generator 26. However, during the occurrence of the switching pulses the shutter 30 allows the light image of the aperture 19 to be projected on the mosaic 6 and in known manner cause the elements thereof to acquire positive potentials which are representative of the intensity of the elemental areas of the projected light image. The aforesaid mechanism for intermittently moving the film 16 is also synchronised, for example by deriving power from the bus-bars 21, 22, in such a way that the film is moved only during the intervals between the switching pulses, the film being moved by a distance of one film frame during the second half (i. e. television frame) of each complete scanning traversal of the mosaic 6 effected by the beam from the gun 2.

Figure 2 illustrates a switching circuit which is suitable for use as either the circuit 27, 28 or 29 but which will however, be assumed to be the circuit 27. It comprises three diode valves 32, 33 and 34; the anodes of the diodes 32 and 33 are interconnected and coupled by a condenser 35 to the switching pulse generator 26, while the cathodes of the diodes 33 and 34 are interconnected and connected to the wall anode 3. The anodes of diodes 32 and 33 are also connected to a source of positive potential 36 of the order of 300 volts positive by a resistance 37, while the cathodes of the diodes 33 and 34 are connected by a large resistance 38 to a potential source 39 of the order of 300 volts negative. The cathode of diode 32 is connected to the tapping of a potentiometer 40 and to earth by a smoothing condenser 41, the potentiometer 40 being connected in series with a resistance 42 between the aforesaid supply 36 and earth. The anode of the diode 34 is likewise connected to the tapping of a potentiometer 43 and to earth by a smoothing condenser 44, the potentiometer 43 being connected in series with a resistance 45 between the potential source 36 and earth. The ratio of the resistance of 40 to 42 is much greater than the ratio of the resistance of 43 to 45 and the tapping on 40 is utilised to determine the higher potential applied to the wall anode 3 while the tapping on 43 is utilised to determine the lower potential applied to the wall anode 3. The switching pulses from 26 are applied in negative sense to the anodes of the diodes 32 and 33 and in the intervals between their occurrences the diodes 32 and 33 conduct and the potential at the tapping on 40 is applied to the wall anode 3. The amplitude of the pulses applied to the anodes of the valves 32 and 33 is arranged to be greater than the difference between the potentials at the tapping on the potentiometers 40 and 43 so that during the occurrence of each pulse the diodes 32 and 33 are rendered non-conducting, the diode 34 then becoming conducting so that the wall anode potential falls to that of the tapping on 43. The potentiometers 40 and 43 allow adjustment of the potentials applied to the wall anode 3, adjustment of the potentiometer 40 serving to control the focussing of the beam in the tube 1.

The lower potentials on the wall anode 3, ion trap 7 and decelerating electrode 8 serve to reduce to a safer limit the maximum positive potential which the photo-sensitive elements of the mosaic 6 can acquire, even although the intensity of the light image falling on the target electrode is high. The mosaic 6 is only illuminated during intervals when these lower potentials are applied and electrodes 3, 7 and 8 cannot then saturate the photo-electron emission from elements of the mosaic which have already become more than a predetermined number of volts positive, so that the risk of the tube becoming unstable in its operation is substantially reduced. The intervals when the potentials are lowered occur only when scanning of the mosaic 6 is discontinued (i. e. during beam black-out) so that scanning is not disturbed. If the lower potentials are below the lower crossover point of the mosaic 6, the tube 1 is in fact rendered inherently stable in operation and if lower potentials are so chosen, the tube will remain stable at the most transparent parts of the film even when the intensity of the light source 17 is sufficient to give satisfactory noise free picture signals from the least transparent parts likely to be encountered in the film. Reduction of the intensity of the light source will still be desirable however, if the average transparency of the film increases, in order to avoid undesirable distortion of the gamma characteristic of the apparatus, and means may be provided for effecting such adjustment automatically. Modification of the gamma characteristic can also be achieved if desired by adjustment of the lower potentials applied, as by the potentiometer 43, to the aforesaid electrodes of the television transmission tube. The application of suppression pulses from 24 to the vision amplifier 12 serves to prevent undesirable signals set up across the impedance 11 due to the switching of the potentials on the electrodes 3, 7 and 8 from appearing in the output of the amplifier 12. In some cases the use of suppression pulses may be found unnecessary, as for example where the electrons of the scanning beams not required for stabilising the target, are directed to an electron multiplier and the signal output is obtained from the multiplier, instead of from a load impedance connected to the signal plate.

Instead of employing a disc type shutter 30 for obscuring the projected image during scanning of the mosaic screen 6 a camera type shutter mechanism may be employed to enable a longer period of exposure to be obtained during said intervals when the switching pulses occur, due to the effectively instantaneous action of a shutter mechanism of this type. Moreover the invention may be applied to C. P. S. tubes of the kind in which, instead of a light image being projected directly on to the mosaic 6 of the target, it is projected on to a photo-cathode and the electron image therefrom is then projected on to the target. If a tube of this type is employed then the mechanical shutter 30 may be replaced by switching mechanism which is capable of switching the electron image off and on as necessary. The tube 1 may in addition be of the kind in which the ion trap electrode 7 is in the form of a mesh disposed transversely of the axis of the tube and conductively connected within the tube to the wall anode 3. The switching circuit 28 is then not required, and the switching circuit 29 may also be unnecessary in some cases, as where the decelerating electrode 8 is normally maintained at only a few volts positive with respect to cathode potential. Furthermore while the invention has been described as applied to the generation of picture signals from cinematograph films it may also be applied to the generation of picture signals directly from actual scenes, especially if the illumination of the scene is good.

I claim:

1. Apparatus for generating television picture signals, comprising a television pick-up tube having a mosaic electrode, means for deflecting an electron-beam to produce scanning traversals of said mosaic electrode with intervals between successive traversals, means for projecting an image to be televised on said mosaic electrode during said intervals and for cutting off said image during said traversals, an electrode in said tube for controlling the saturation of electron emission from said mosaic electrode, and switching means for maintaining said second electrode at one potential during said traversals and at a lower potential during said intervals to reduce the potential to which the mosaic electrode can be charged by said image.

2. Apparatus for generating television picture signals, comprising a television pick-up tube having a mosaic electrode, means for deflecting an electron-beam to produce scanning traversals of said mosaic electrode with intervals between successive traversals, means for projecting an image to be televised on said mosaic electrode during said intervals and for cutting off said image during said traversals, an electrode in said tube for controlling the saturation of electron emission from said mosaic electrode, means for generating switching pulses synchronized with said intervals, and thermionic valve switching means for operation under the control of said switching pulses for maintaining said second electrode at one potential during said traversals and at a lower potential during said intervals to reduce the potential to which the mosaic electrode can be charged by said image.

3. Apparatus for generating television picture signals, comprising a television pick-up tube having a photo-electrically sensitive mosaic electrode, a transparent support supporting said mosaic electrode, means for deflecting an electron-beam to produce scanning traversals of said mosaic electrode with intervals between successive traversals, means for projecting a light image through said support on to said mosaic electrode during said intervals, a shutter for cutting off said light image during said traversals, an electrode in the vicinity of said mosaic electrode for controlling the saturation of electron emission from said mosaic electrode, and switching means for maintaining said second electrode at one potential during said traversals and at a lower potential during said intervals to reduce the potential to which the mosaic electrode can be charged by said image.

4. Apparatus for generating television picture signals, comprising a television pick-up tube having a mosaic electrode, means for generating a beam of electrons approaching said mosaic electrode with a low velocity, said means including an electrode in the vicinity of said mosaic electrode for controlling the saturation of electron emission from said mosaic electrode, means for deflecting said beam to produce successive scanning traversals of said mosaic electrode, means for extinguishing said beam during intervals between successive traversals, means for projecting an image to be televised on to said mosaic electrode during said intervals and for cutting off said image during said traversals, and switching means for maintaining said second electrode at one potential during said traversals and at a lower potential during said intervals to reduce the potential to which the mosaic electrode can be charged by said image.

5. Apparatus for generating television picture signals, comprising a television pick-up tube having a mosaic electrode, a transparent support supporting said mosaic electrode, means for generating a beam of electrons approaching said electrode with a low velocity, said means including a source of electrons and an anode electrode surrounding the beam path between said source and said mosaic electrode, means for deflecting said beam to produce scanning traversals of said mosaic electrode with intervals between successive traversals, means for projecting a light image through said support on to said mosaic electrode during said intervals, a shutter for cutting off said image during said traversals, means for generating switching pulses synchronized with said intervals, and thermionic valve switching means for operation under the control of said switching pulses for maintaining said anode electrode at a relatively high positive potential with respect to said source during said traversals and at a lower positive potential during said intervals to reduce the potential to which the mosaic electrode can be charged by said light image.

6. Apparatus according to claim 5, comprising a beam-decelerating electrode disposed between said anode electrode and said mosaic electrode, and thermionic valve switching means for operation under the control of said switching pulses for maintaining said decelerating electrode at a potential intermediate said anode electrode and said source during said traversals and for reducing said delecerating electrode potential during said intervals.

7. Apparatus according to claim 5, comprising an ion trap electrode disposed between said anode electrode and said mosaic electrode, and thermionic valve switching means for operation under the control of said switching pulses for maintaining said ion trap electrode at a more positive potential than said wall anode during said traversals and for reducing said ion trap electrode potential during said intervals.

8. In apparatus for generating television picture signals from cinematograph film embodying a television pick-up tube having a photoelectrically sensitive mosaic electrode, and means including an electrode for controlling the saturation of electron emission from said mosaic electrode to produce low velocity electron beam scanning of said mosaic electrode, whereby said tube operates with cathode potential stabilization; a film gate, means including a shutter synchronized with said scanning means for projecting a light image from said gate on to said mosaic electrode during return times between frame scanning traversals of said mosaic electrode and for cutting off said image during said scanning traversals, film transport mechanism synchronized with said scanning means for displacing the film only during said scanning traversals to cause successive frames of the film to be exposed stationarily in said film gate during said return times, and switch means for maintaining said second mentioned electrode at a relatively high positive potential during said scanning traversals and for reducing said potential during said return times.

CHARLES ALAN JOHNSON.

References Cited in the file of this patent

UNITED STATES PATENTS

| Number | Name | Date |
|---|---|---|
| 2,082,093 | Bedford | June 1, 1937 |
| 2,083,995 | Henroteau | June 15, 1937 |
| 2,146,822 | Henroteau | Feb. 14, 1939 |
| 2,200,048 | Urtel | May 7, 1940 |
| 2,242,034 | Knick | May 13, 1941 |
| 2,287,033 | Goldmark | June 23, 1942 |
| 2,292,817 | Bedford | Aug. 11, 1942 |
| 2,305,902 | Schroeder | Dec. 22, 1942 |
| 2,337,234 | Eaton | Dec. 21, 1943 |
| 2,404,046 | Flory | July 16, 1946 |
| 2,451,640 | Thalner | Oct. 19, 1948 |
| 2,463,038 | Kell | Mar. 1, 1949 |
| 2,534,627 | Schade | Dec. 19, 1950 |

FOREIGN PATENTS

| Number | Country | Date |
|---|---|---|
| 590,468 | Great Britain | July 18, 1947 |